United States Patent [19]
Mares et al.

[11] Patent Number: 5,135,998
[45] Date of Patent: * Aug. 4, 1992

[54] PROCESS FOR FORMING A FLUORINATED COPOLYMER

[75] Inventors: Frank Mares, Whippany; Bryce C. Oxenrider, Florham Park, both of N.J.; David J. Long, Amherst, N.Y.; John P. Sibilia, Livingston, N.J.

[73] Assignee: Allied-Signal Inc., Morristown, N.J.

[*] Notice: The portion of the term of this patent subsequent to Dec. 3, 2008 has been disclaimed.

[21] Appl. No.: 726,091

[22] Filed: Jul. 5, 1991

Related U.S. Application Data

[60] Division of Ser. No. 616,487, Nov. 21, 1990, Pat. No. 5,032,656, which is a continuation-in-part of Ser. No. 124,708, Nov. 20, 1987.

[51] Int. Cl.$^5$ ............................................. C08F 2/00
[52] U.S. Cl. .................................. 526/206; 526/249; 526/255
[58] Field of Search ..................... 526/206, 249, 255

[56] References Cited

U.S. PATENT DOCUMENTS

| | | | |
|---|---|---|---|
| 2,468,664 | 4/1949 | Hanford et al. | 260/86 |
| 3,445,434 | 5/1969 | Stilmar | 260/80.71 |
| 4,557,955 | 12/1985 | Walch et al. | 428/36.5 |
| 5,032,656 | 7/1991 | Mares et al. | 526/255 |

OTHER PUBLICATIONS

European Polymer Journal 1967 vol. 3 pp. 5–12 "Vinyl Acetate and Vinyl alcohol copolymers with Tetrafluoroethylene".

*Primary Examiner*—Joseph L. Schofer
*Assistant Examiner*—N. Sarofim
*Attorney, Agent, or Firm*—R. C. Stewart, II; G. H. Fuchs; D. L. Webster

[57] ABSTRACT

A process of preparing a copolymer of a vinyl monomer such as vinyl acetate, vinyl propionate and vinyl trifluoroacetate, and of fluorinated monomer such as tetrafluoroethylene and trifluoroethylene, said copolymer having an alternating or substantially alternating distributing of vinyl recurring monomeric units and fluorinated recurring monomeric units in the copolymers backbone which comprises copolymerizing said monomers in a reaction medium of a chlorocarbon, a fluorocarbon a chlorofluorocarbon or a mixture thereof.

28 Claims, 1 Drawing Sheet

PROCESS FOR FORMING A FLUORINATED COPOLYMER

RELATED APPLICATIONS

This application is a division of application Ser. No. 616,487, filed Nov. 21, 1990, now U.S. Pat. No. 5,032,656, which in turn is a continuation-in-part application of Ser. No. 124,708, filed Nov. 20, 1987.

BACKGROUND OF THE INVENTION

This invention is in the field of fluoropolymers. More particularly this invention relates to fluorine containing copolymers and barrier films made therefrom.

Monomers such as tetrafluoroethylene and chlorotrifluoroethylene have been used to make homopolymers and copolymers. Typical copolymers based on tetrafluoroethylene or chlorotrifluoroethylene are disclosed in U.S. Pat. Nos. 3,624,250; 4,123,602; 3,642,742; 4,513,129; and 3,847,881, and P.D. File 82-2155. U.S. Pat. No. 4,434,273 discloses perfluorovinyl ethers and copolymers of such materials with tetrafluoroethylene. U.S. Pat. Nos. 4,471,076 and 4,500,739 disclose fluorocarbon polymers containing carboxyl groups. U.S. Pat. No. 4,513,129 discloses copolymers of ethylene, tetrafluoroethylene or chlorotrifluoroethylene and fluorovinyl compounds of the formula $H_2C=CFR_f$ where $R_f$ is fluoroalkyl group of $C_2-C_{10}$.

Improved barrier resistance of ethylene vinyl alcohol copolymers is disclosed in U.S. Pat. No. 4,427,825 and the Background of the Invention thereof, as well as related U.S. Pat. No. 4,468,427.

The above review of the art shows a great variety of fluoropolymers and copolymers. Modena, et al. *Vinyl acetate and Vinyl Alcohol Copolymers with Tetrafluoroethylene*, European Polymer Journal, 1967. Vol. 3, pp.5-12, Pergamon Press Limited, England (1967) discloses a specific class of copolymers of vinyl acetate and vinyl alcohols. Copolymers of tetrafluoroethylene and vinyl acetate are disclosed in Great Britain Patent 583,482 and U.S. Pat. No. 2,468,664. The Great Britain and U.S. patents disclose copolymers of tetrafluoroethylene and vinyl acetate but do not disclose polymers of tetrafluoroethylene with vinyl alcohol nor is there a recognition in any of these disclosures of improved barrier resistance to gases such as oxygen and that the fluorinated and vinyl units are distributed along the copolymer chain in a substantially alternating fashion.

SUMMARY OF THE INVENTION

The present invention is directed to a copolymer of a fluoromonomer having the formula $R_1R_2C=CR_3F$, wherein $R_1$, $R_2$ and $R_3$ are the same or different and are selected from H and F, and wherein when $R_1$ and $R_2$ are F, $R_3$ may also be Cl; and a vinyl monomer having the formula $H_2C=CHR_x$, wherein $R_x$ is a radical having the formula $-O_2CR_y$, wherein $R_y$ is a radical selected from $CH_3$ and $C_2H_5$.

The resulting copolymer comprises fluorinated units having the formula $-(R_1R_2C-CR_3F)-$, wherein $R_1$, $R_2$ and $R_3$ are as described above and corresponding amounts of vinyl units having the formula $-(H_2C-CHR_x)-$, wherein $R_x$ is a radical having the formula $-O_2CR_y$, wherein $R_y$ is selected from $-CH_3$ and $-C_2H_5$. In an alternate and preferred embodiment the copolymer is hydrolyzed so that $R_x$ becomes $-OH$.

The copolymer can contain from 40 to 60, preferably 45 to 55 mole percent of the fluorinated units and a corresponding amount of the vinyl units. The copolymer can contain up to 10 percent of at least one additional comonomer.

When $R_x$ is OH and $R_3$ is selected from H and F, the copolymer of the present invention is a crystalline polymer. A species of this copolymer has a single melting point peak when measured using a DuPont 990 Differential Scanning Calorimeter (DSC). The procedure is to heat a 7 to 10 mg sample at 20° C./minute from room temperature to 300° C. This is followed by a quick quench in liquid nitrogen and reheating to determine reproducibility.

The fluorinated and vinyl units are substantially uniformly and homogeneously distributed along the copolymer chain. It is a crystalline copolymer with substantially few and preferably no blocks in which either the fluorinated units or vinyl units predominate. This is particularly important for improved barrier properties of film made from the polymer. The major monomer units are preferably, substantially alternating in distribution when there is the preferred amount of from 45 to 55 mole percent of the fluoromonomer and the vinyl monomer.

The polymers of this invention exhibit several advantages as compared to block copolymers. For example, the copolymers of this invention are solution and melt processible which greatly facilitates their fabrication into useful articles as for example films, fibers and like which have good tensile properties. The copolymers of this invention are also thermally stable at temperature as high as 325° to 350° C., and are resistant to changes in melt viscosity after exposure to temperatures of as high as 290° C. for time periods of up to 30 minutes. The ester form of the copolymer of this invention can be hydrolyzed (preferably fully) to form the hydroxy form having improved crystallinity and excellent barrier properties against oxygen and moisture.

The copolymer of the present invention is useful to make articles such as fiber, molded bottles and films having at least one layer made from the copolymer of the present invention.

The present invention also includes a method of making the copolymer of the present invention which comprises the steps of copolymerizing monomers having the formulas $R_1R_2C=CR_3F$ and $H_2C=CHR_x$ where $R_1$, $R_2$, $R_3$, and $R_x$ are defined above. A particular useful and preferred method to make the copolymers of the present invention is in an aqueous media as disclosed in copending U.S. Ser. No. 123,480 filed Nov. 20, 1987, now abandoned, hereby incorporated by reference.

DETAILED DESCRIPTION OF THE INVENTION

Figure 1:
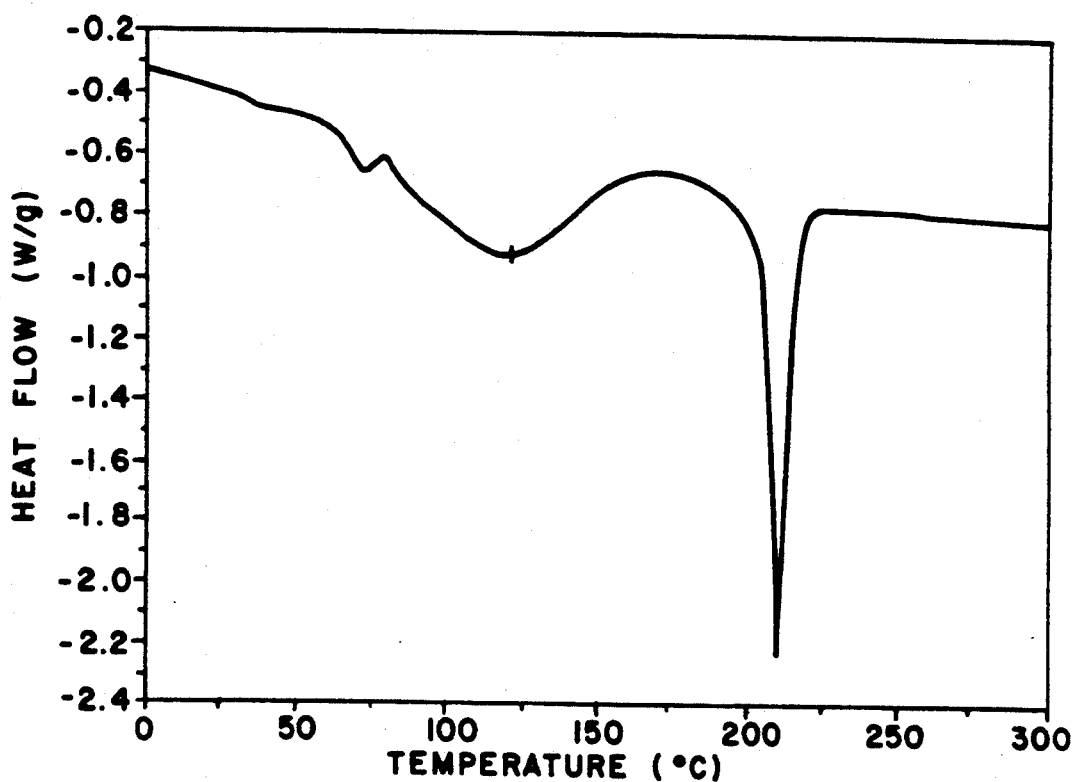
FIGS. 1 and 2 are Differential Scanning Calorimetry graphs of heat flow (W/g) vs. T (° C.) for copolymers of the present invention and comparative copolymers.

The present invention is a copolymer of a fluoromonomer having the formula $R_1R_2C=CR_3F$ wherein $R_1$ and $R_2$ are the same or different and are selected from H and F, and wherein when $R_1$ and $R_2$ are F, $R_3$ may be Cl; and a vinyl monomer having the formula $H_2C=CHR_x$, wherein $R_x$ is a radical having the formula $-O_2CR_y$, and wherein $R_y$ is a radical selected from $-CH_3$ and $-C_2H_5$.

The resulting copolymer comprises fluorinated units having the formula ($R_1R_2C$—$CR_3F$) wherein $R_1$, $R_2$ and $R_3$ are selected from H and F and wherein when $R_1$ and $R_2$ are F, $R_3$ may be Cl; and corresponding amounts of vinyl units having the formula ($H_2C$-$CHR_x$) wherein $R_x$ is a radical having the formula —$O_2CR_y$ wherein $R_y$ is selected from —$CH_3$ and —$C_2H_5$. In an alternate and preferred embodiment, the copolymer is hydrolyzed so that $R_x$ becomes —OH.

The preferred copolymers are those in which $R_1$, $R_2$ and $R_3$ are the same or different and are H and F, with the proviso that at least one of $R_1$, $R_2$ and $R_3$ is F and $R_x$ is OH or —$O_2CR_y$ wherein $R_y$ is a radical selected from —$CH_3$ and —$C_2H_5$. More preferred copolymer of the present invention are those where $R_1$ and $R_3$ are selected from the group consisting of H and F and are preferably F; $R_2$ is F; and $R_x$ is OH or —$O_2CR_y$ wherein $R_y$ is a radical selected from —$CH_3$ and —$C_2H_5$. The embodiment of the copolymer where $R_x$ is —OH is particularly preferred due to its crystalline properties, and the permeation resistance to moisture ($H_2O$) and oxygen gas ($O_2$). It is preferred to hydrolyze as many of the ester groups as possible, however, minor amounts of residual ester groups may be present. The most preferred polymer is a hydrolyzed copolymer derived from tetrafluoroethylene and vinyl acetate. This is called a copolymer of tetrafluoroethylene and vinyl alcohol.

The preferred copolymers of the present invention include but are not limited to copolymers of fluoromonomers selected from vinyl fluoride, trifluoroethylene, tetrafluoroethylene, vinylidene fluoride, and vinyl acetate as the vinyl monomer.

The copolymer of the present invention has from 40 to 60, and most preferably 45 to 55 mole percent of the fluorinated units, and a corresponding amount of the vinyl units.

The copolymer can contain a minor amount of up to 10 mole percent of at least a third comonomer. The presence of additional comonomer is not objectionable so long as it does not deteriorate the desired properties of the polymer and in particular does not adversely affect distribution of the two major monomeric units along the copolymer chain, or inhibit the crystallite formation in the hydrolyzed embodiment.

The copolymer of the present invention has a substantially uniform and homogeneous distribution of the two major monomeric units along the polymer backbone. In the most preferred embodiments where there are from 45 to 55 mole of percent fluorinated units and corresponding amounts of vinyl units, the two units are preferably substantially alternating in their distribution. The procedure for determining the degree of alternation is by 1H Fourier Transform Nuclear Magnetic Resonance Spectroscopy. The procedure is reviewed in detail below. For the purpose of the present invention, substantially alternating is at least about 40% alternating as measured by this procedure. Preferred alternating values are from about 40% to about 80%, and most preferred alternating values are from about 60% to about 80%. It is believed that there are amounts of end groups, and short segments such as segments having dimer and trimer length which are not measured as alternating but are not considered blocks which significantly alter the properties of a copolymer of the present invention.

The copolymer of the present invention, wherein the vinyl unit is a vinyl alcohol, is an advancement due to the structural relationship of the two major monomeric units and the resulting crystallinity of the copolymer. Individual species of the copolymer have a single melting point peak when measured by a Differential Scanning Calorimeter (DSC) (FIG. 1). The DSC used to characterize the present invention is a DuPont 9900 thermal analyzer. The procedure is to use a 7 to 10 mg sample of the copolymer heated at 20° C. per minute from room temperature to 300° C. The samples were quick quenched in liquid nitrogen and reheated to determine reproducibility.

The hydrolyzed, crystalline copolymer of the present invention, having a substantially uniform and homogenous alternating distribution of the vinyl units and tetrafluoroethylene units along the polymer backbone, is an improvement over art disclosed block copolymers having tetrafluoroethylene unit rich blocks and vinyl unit rich blocks. DSC testing of individual species of prior art hydrolyzed block copolymers, exhibits two broad peaks of the species. There is a broad melting point peak from the tetrafluoroethylene unit rich blocks at a temperature of greater than about 250° C and separate broad melting point peak from the second monomer, i.e., the vinyl alcohol, rich blocks at about 200° C.

The individual species of the copolymer of the present invention has no mutually immiscible phases of either the fluorinated units or the vinyl units to result in separate peaks when measuring the DSC of the species of the copolymer according to the process recited above; or which are apparent when a sample of the copolymer is viewed under the Transmission Electron Microscope (TEM) at a magnification of 15,000 to 25,000.

The molecular weight of the copolymer of the present invention can be varied as desired. In the preferred embodiments of the invention, the use of a small amount of a chain transfer agent such as isopropanol (Examples 12, 14 and 29) can control the molecular weight. The intrinsic viscosity of the copolymers of the present invention measured at 35° C. in dimethylformamide (DMF) according to the ASTM D-1238 procedure is from 0.1 to 2.5, preferably from 0.2 to 1.5, more preferably from 0.3 to 1.3 and most preferably 0.5 to 1.2.

The copolymer of the present invention can be made in an aqueous medium or in a suitable solvent. A useful and preferred method is disclosed in copending application Ser. No. 123,480, filed Nov. 20, 1987, now abandoned.

The preferred method as recited in the referenced application is copolymerizing a vinyl monomer of the formula $H_2C$=$CHR_x$, where $R_x$ is a radical —$O_2CR_y$, where $R_y$ is a radical selected from $CH_3$ and $C_2H_5$; and fluoromonomer of the formula: $R_1R_2C$=$CFR_3$ wherein $R_1$, $R_2$ and $R_3$ are the same or different and are selected from the group consisting of H, and F, and where $R_3$ is selected from Cl and F, when $R_1$ and $R_2$ are F. The aqueous medium comprises from 45 to 99, preferably 45 to 85, and more preferably 50 to 70 percent by weight of a water miscible cosolvent and a corresponding amount of a water. The cosolvent should be water soluble and have low chain transfer properties such as acetic acid, methyl acetate, t-butyl alcohol, acetonitrile and the like. The fluoromonomer should have greater solubility in the aqueous medium as a result of the cosolvent. The vinyl monomer is soluble in the aqueous medium. The amount of vinyl monomer is limited to that amount which is soluble in the aqueous solution. The copolymerization is preferably conducted in the presence of a water soluble initiator and may optionally contain a water soluble fluorosurfactant which preferably has groups selected from alkali metal sulfonates, alkali metal carboxylates, ammonium carboxylates, and ammonium sulfates. The copolymerization is initiated in the homogeneous aqueous solution. Copolymer particles form. The cosolvent preferably causes the copolymer particles to swell. The monomers including the fluoromonomer are carried into the swollen particles with the cosolvent. The result is a homogeneous and preferably alternating copolymer.

The aqueous medium is fed to a reactor with a vinyl monomer, and optionally the surfactant. The fluoromonomer is fed to the reactor and maintained at a constant pressure throughout the course of polymerization with some dissolved in the aqueous solution. The temperature is controlled and the initiator is injected. The preferred initiator is an oxidation-reduction system. Polymerization is initiated in the homogeneous mixture of comonomers. The polymerization results in a suspension of polymer particles which are swollen by the cosolvent. The comonomers diffuse into the particles containing the growing polymers chains. The vinyl monomer is fed concurrently in rates equivalent to the consumed fluoromonomer so as to maintain the desired copolymer composition.

Another useful method to make the copolymers of the present invention comprises the step of copolymerizing $R_1R_2C=CR_3F$ and $H_2C=CHR_x$ in a chlorofluorocarbon solvent at a temperature range of above the freezing point of the solvent, preferably from about −20° C. to about 100° C., more preferably from about 0° C. to about 50° C., and most preferably from about 20° C. to about 40° C. in the presence of a polymerization initiator. In the preferred embodiments, a solvent with a very low chain transfer constant is used. Even solvents such as ethylacetate (Example 9) and acetic acid (Example 10), which have very little tendency to chain transfer, have enough chain transfer characteristics to limit the intrinsic viscosity to lower than preferred values of from about 0.5 to about 1.2. The pressure is provided by the fluoromonomer and an inert gas such as nitrogen as well as the vapor pressure of the solvent. The pressure is typically from about 1 atm to about 30 atm, preferably from about 1 atm to about 25 atm. The amount of polymer formed can be determined by measuring the amount of monomers consumed. The process can be batch or continuous.

Saturated fluoro or chlorofluorocarbon, solvents preferably having 1 to 4, especially 1 to 2 carbon atoms, are preferred as the non-aqueous copolymerization reaction medium. Suitable solvents include solvents in which both the fluoromonomer and vinyl monomer are soluble and include: dichlorodifluoromethane, trichloromonofluoromethane, chlorotrifluoromethane, trichlorotrifluoroethane, dichlorotetrafluoroethane, hexafluoroethane, perfluoropropane, perfluorocyclobutane, etc. and a mixture thereof. It is preferred to use a saturated fluoro- or chlorofluoro- carbon which does not have a C—H bond in the molecule.

The amount of solvent used is not limited. The copolymerization reaction can be carried out by using a suitable amount of solvent. Useful amounts have been found to be from about 10 to 100 ml of solvent to each gram of polymer produced.

The reaction temperature can be determined depending upon the type and amount of solvent, the molar ration of the monomers, the type of polymerization initiator, whether there is external cooling, and the like.

As indicated above, a wide variety of polymerization initiators as for example organic peroxy compounds and redox systems can be used depending upon the polymerization system. Suitable peroxy compounds such as free radical initiators can be the perfluoroperoxides such as bis(perfluorobutyryl) peroxide, and bis(perfluorooctanoyl)peroxide, or azo compounds, such as azabisisobutyronitrile and suitable redox systems include ammonium persulfate and ascorbic acid and potassium persulfate and sodium bisulfite. Organic peroxy compounds or azo compounds are preferred when using organic solvent systems and redox initiators are preferred in aqueous solvent systems.

The quantity of initiator is not critical. However, it is necessary to use a sufficient amount to effectively carry out the copolymerization reaction. For example, when using redox systems such as ammonium persulfate and ascorbic acid results are attainable when the initiator is used in amounts of more than about 0.0001 part, preferably about 0.001 parts to about 1.0 part by weight per 100 parts by weight to total monomers.

The concentration of the free radical initiator in an organic solvent such as a chlorofluorocarbon type solvent is typically more than about 0.001 parts, and preferably about 0.001 to about 0.5 parts by weight per 100 parts by weight of total monomers initially charged.

When a chlorofluorocarbon type solvent is used, the solvent can be easily separated together with the unreacted monomers from the resulting copolymers after the copolymerization.

Copolymers having vinyl units where $R_x$ is $-O_2CR_y$, can be hydrolyzed to vinyl alcohol by suitable means. A preferred method is by contacting the ester copolymer, in solution, with a strong base such a sodium hydroxide. A useful solvent is an alcohol such a methanol. The typical hydrolysis can be conducted at from −10° C. to 100° C., depending on the boiling point of the solvent. Depending on temperature, the reaction times can be from 30 minutes to 24 hours. It is convenient to hydrolyzed the copolymer at atmospheric pressure.

The hydrolyzed copolymer of the present invention is useful for making a variety of articles. In particular, it has been found to be extrudable and moldable, and to have exceptional resistance to permeation by gases such as oxygen. It is believed that these unique properties result from the substantially uniform and homogeneous, preferably substantially alternating distribution of the fluorinated and vinyl units in the copolymer backbone resulting in a tightly packed crystalline or substantially crystalline structure for the hydrolyzed copolymer. It is therefore useful to make articles having one or more layers of this polymer where oxygen permeation or improved oxygen barrier is critical such as in films and bottles. It also has improved resistance to water vapor transmission. This is believed to be a result of the tightly packed crystalline structure of the hydrolyzed copolymer.

Ethylene vinyl alcohol copolymers are known to have excellent resistance to oxygen permeation at low humidities. However, as the relative humidity increases to from 70 to 100 percent, the oxygen permeability increases. However, when using the copolymer of the present invention, the oxygen permeability remains relatively constant even at high humidity conditions of from 70 to 100 percent relative humidity.

Films can be made by conventional film forming processes including casting and extruding. The film can be used alone or in combination with other layers as a composite formed by coextrusion or by laminating separate layers of film. The use of adhesive layers is optional and depends on the composition of the adjacent film layers.

A particularly convenient method of production of film composites is the simultaneous coextrusion of several resins as an extrudate. Such coextrusion methods are well known in the art.

The film composites and film laminates made by the present invention may be oriented by conventional means and/or embossed as desired.

In addition to making films and film composites, the polymer of the present invention can be formed by other forming processes including blow molding to form bottles as well as molded parts and formable sheets. The copolymer can be compounded with conventional additives known in the art. Such additives include fillers, other polymeric materials such as impact modifiers, and inhibitors of oxidative, thermal, and ultraviolet light degradation, lubricants and mold release agents, colorants including dyes and pigments, fibers and particulate fillers and reinforcements, plasticizers, etc.

Compositions containing the polymer of the present invention can be prepared by melt blending in a closed system such as an extruder, or other conventional plasticating devices. Compositions of the present invention can be blow molded. Alternately, the polymer can be processed by precipitation from solution, by blending or by dry mixing with other components followed by melt fabrication of the dry mixture by extrusion or molding or by solution casting and coating.

In addition to the articles mentioned above, the polymer can be used in a variety of articles made by conventional fabrication methods to form tubing, sheet, fibers, and oriented fibers, and wire coating.

Several examples are set forth below to illustrate the nature of the invention and the manner of carrying it out. However the invention should not be considered as being limited to the detail thereof. All parts are by weight unless otherwise indicated.

EXAMPLES 1-5

The following examples illustrate the preparation of a copolymer of tetrafluoroethylene (TFE) and vinyl acetate (VAc). The polymerization was conducted using fluorocarbon G-113 (1,1,2-trichloro- 1,2,2 trifluoroethane) as a solvent. The initiator used was bis(perfluorobutyryl) peroxide (4-P). The reaction was conducted in a 500 ml or 4 liter closed reactor. The reactants were stirred at a stir rate of 200 rpm. The atmosphere above the solvent was a mixture of nitrogen and TFE held at a constant pressure. The copolymer was collected as a gelatinous mass and dried to a white solid. The processing conditions are summarized in Table 1. The composition in each case was determined by elemental analysis. The percents by weight of C and H are summarized below. The intrinsic viscosity $[\eta]$ was measured at 35° C. in dimethyl formamide (DMF).

TABLE 1

|  | Ex. 1 | Ex. 2 | Ex. 3 | Ex. 4 | Ex. 5 |
| --- | --- | --- | --- | --- | --- |
| Solvent G-113, ml | 400 | 400 | 300 | 300 | 2100 |
| 4-P, mg | 50 | 50 | 50 | 50 | 350 |
| VAc, (g) initial | 3 | 3 | 3 | 3 | 35 |
| VAc, (g/hr) feed | 1.5 | 1.5 | 1.5 | 1.5 | 7 |
| N₂, psi | 25 | 50 | 38 | 38 | 37.5 |
| TFE, psi | 50 | 100 | 75 | 75 | 75 |
| stir, rpm | 200 | 200 | 200 | 200 | 200 |
| time, min | 354 | 150 | 200 | 420 | 375 |
| drying,T,P (°C., mm) | 50°, 1 mm | 50°, 1 mm | 80°, 1 mm | 80°, 1 mm | 65°, — |
| Yield, g | 14.4 | 10.9 | 9.4 | 11.8 | 91.1 |
| $[\eta]$ | 0.99 | 2.47 | 1.18 | 1.49 | 1.01 |
| % C | 38.32 | 35.79 | 39.23 | 38.87 | 39.23 |
| % H | 3.90 | 2.50 | 3.44 | 3.59 | 3.39 |
| Tg, °C. | — | 40 | — | — | — |
| TGA, 5% wt loss @ 2 | — | 370°C. | — | — | — |

EXAMPLE 6

Example 6 illustrates the hydrolysis of the tetrafluoroethylene vinyl acetate copolymer made from Example 2, and an evaluation of the film forming characteristics of the hydrolyzed product and the oxygen permeability of the film formed from the hydrolyzed product as a function of humidity. The copolymer (10.4 grams) was stirred in 150 ml of methanol chilled to 5° C. A solution of 10.4 ml of a 50 percent aqueous sodium hydroxide solution was added drop-wise controlling the rate to maintain the temperature at 10° C. The reaction mixture was stirred at room temperature for 16 hours. The hydrolyzed copolymer was recovered by pouring the solution into one liter of ice water in a Waring Blender. The copolymer was filtered from the solution and was dried at room temperature, 1 mm Hg pressure for 18 hours. The copolymer was a white solid, and the yield was 7.5 grams. DSC indicates a melting point of 222° C. and no melting point peaks above 230° C. This indicates that the copolymer has a substantially uniform and homogeneous distribution of fluorinated and vinyl units in the copolymer backbone and does not include large TFE blocks. The thermal gravimetric analysis (TGA) indicates a 5 percent weight loss by 370° C. with a major decomposition taking place over 400° C.

The hydrolyzed tetrafluoroethylene-vinyl acetate (now tetrafluoroethylene/vinyl alcohol) copolymer was dissolved in 200 ml of acetone at room temperature for 3 hours. It was then filtered through a coarse (40–60) frit, then a 7.0 micron filter. The polymer was again recovered by pouring into one liter of ice water in a Waring Blender and filtering. It was pressed free of excess water and dried at room temperature at a pressure of 1 mm Hg. The yield was 5.9 grams. The intrinsic viscosity was 2.17 in acetone. The intinsic viscosity was 2.01 (10.4 insolubles) at 30° C., using DMF. The sample was formed into a film and tested for oxygen permeability using an Ox-Tron 1000 oxygen permeability tester made by Mocon Corp. This indicates that the copolymer has good film forming properties. The oxygen permeability at 0% relative humidity (RH) was 0.154 cc/100 sq in/mil/day. At 100% relative humidity the oxygen permeability was 0.70/cc/100 sq in/mil/day. This indicates that the film has a relatively low permeability to oxygen regardless of the relative humidity.

EXAMPLE 7

Following is a procedure for the hydrolysis of a vinyl acetate/tetrafluoroethylene (VAC/TFE) copolymer to vinyl alcohol/tetrafluoroethylene (VOH/TFE) copolymer, and an evaluation of the film forming characteristics of the hydrolyzed product and the oxygen permeability of the film formed from the hydrolyzed product as a function of humidity. The VAC/TFE (8.1 grams)

made in Example 3 and 11.5 grams of the VAC/TFE made in Example 4 (totaling 19.6 grams) were stirred in a 3 neck 100/ml round bottom flask containing a stir bar and a thermometer as well as a water condenser and an nitrogen inlet. The flask contained 390 ml of methanol, 8.4 ml of 50 percent aqueous sodium hydroxide plus 18 ml of water. The mixture was heated and refluxed at 67° C. for 2 hours. A yellow solution formed with a small amount of undissolved material. Twelve ml of concentrated HCl were added (pH1). The solution became milky white, and the yellow color was gone. The polymer was precipitated by adding 100 ml of the polymer solution to 300 ml of water plus 100 ml of ice in a Waring Blender. The solids were collected in five batches. The combined solids were washed three times in 350 ml of water with 100 ml of ice and then dried in a vacuum oven at 80° C. overnight at about 12 ml of mercury. Off-white solids were obtained and redissolved in acetone at room temperature. The solids were filtered and then precipitated out using an 800 ml polymer solution in 1400 ml of chilled water which had been passed through a millipore filter. The solids were once again washed three times with 500 ml of chilled, filtered water. The solids were dried in a vacuum oven for almost 20 hours at 81° C. A light cream colored free flowing solid (11.8 grams) was recovered. This material was found to have 33 31 percent C and 2.81 percent H. The sample was formed into a film showing that it had good film forming properties. The film was tested for oxygen permeability using an Ox-Tran 100 oxygen permeability tester made by Mocon Corp. At 0 percent relative humidity a 3.2 mil thick film had from 0.0 to 0.059 cc per 100 sq. in. per day which corresponds to 0.00 to 0.18 cc per 100 sq in per mil per day. The sample was tested at 100 percent relative humidity and had 0.0 to 0.1194 cc/100 sq in/mil/day and 0.00 to 0.38 cc/100 sq in/mil/day. This indicates the the film has low permeability to oxygen regardless of the relative humidity.

EXAMPLE 8

Example 8 is a laboratory example of hydrolyzing the vinyl acetate/TFE copolymer made in Example 5 and an evaluation of the film forming and tensile properties of the hydrolyzed product. The procedure was similar to that of Example 7 except a 2 liter flask was used. The flask was charged with 85.3 g of the vinyl acetate/TFE copolymer, 853 ml of methanol, 17.1 ml of water and 37.7 ml of aqueous 50 percent sodium hydroxide. It was heated to reflux and held for 2.5 hours. The result was a fairly clear amber very viscous solution having a pH of about 11. About 25 g of Celite ® filter aid sold by Aldrich was added to the solution and it was filtered. It was acidified with a total of 87 ml of concentrated hydrochloric acid to a pH of about 1. After precipitation and washing the solids were collected by filtration and dried at about 44° C. overnight at a pressure of 1 mm Hg. About 58.8 g of cream colored polymer were recovered. The viscosity at 35° C. in DMF was measured to be 1.54. The TGA of the sample showed about a 1 percent weight loss between room temperature and 100° C. This was followed by a stable plateau up to 325° C. The main degradation occurred above that point. DSC was measured on an 8.4 mg sample and indicated a single melting point of about 210° C. and the absence of any melting point above 230° C. Upon reheating, after quenching from 300° C. the main melt point appears at 208° C. This indicates that the copolymer has a substantially uniform and homogeneous distribution of fluorinated and vinyl units in the copolymer backbone and does not contain large TFE blocks. This is shown on FIG. 1 which is a plot of watts/grams (W/g)vs. T(° C.).

The following table summarizes test results made using the copolymer produced in Example 5 and the hydrolyzed copolymer made in Example 8. Molecular weight was measured by low angle laser light scattering using a chromatic $KM_x$-6 instrument using solutions of 0.1 to 0.8% by wt. concentration of copolymer in pyridine at room temperature. Tensile testing was conducted at 23° C., 50 percent relative humidity using ASTM D-638. Samples were molded using a hydraulic platen press at 500° F. in a two piece 5 inch closed mold. Type C tensile samples and DMA specimens were molded. The DMA was determined on a Polymer Laboratories DMTA in an inert atmosphere in the temperature range of −120° C. to 175° C. at a heating rate of 30° C./minute. The frequency was 1 hertz and the sample size was 1.9×9.5×5 mm. There were two peaks one at 81° C. and the other at 134° C. The first peak is believed to be the result of the glass transition temperature of the amorphous phase and the second peak at 134° C. is believed to result from the motion of segments in the interfacial regions between the amorphous and crystalline phases. Tensile results which show that the copolymer has good film forming and tensile characteristics are summarized in Table 2 below.

TABLE 2

|  | Ex. 5 | Ex. 8 |
| --- | --- | --- |
| Polymer | TFE/VAC | TFE/VOH |
| Mwt | $6.75 \times 10^5$ | $5.00 \times 10^5$ |
| Yield stress (psi) | — | $2.97 \times 10^6$ |
| Yield strain (%) | — | 10.4 |
| Max load (lb) | — | 123 |
| Tensile strength (psi) | — | 6824 |
| Total Elong (%) | — | 91.6 |
| Break Str (psi) | — | 6810.6 |

EXAMPLE 9

Example 9 illustrates the preparation of a copolymer of vinyl acetate and TFE using 750 ml of ethyl acetate as a solvent in a 4 liter stirred reactor from which atmospheric oxygen is removed by sparging with nitrogen. The initiator used was 250 mg azabis(isobutyrylnitrile) (ABN). Twenty five grams of vinyl acetate were added to the ethyl acetate and ABN under about 75 psi of nitrogen at the conditions summarized on Table 3 below. This was followed by the addition of 150 psi of TFE. The reactants were stirred at 200 rpm.

TABLE 3

| Time (min) | p (psi) | Temp (°0) | Comment |
| --- | --- | --- | --- |
| 0.0 | 67.5 | 23 | Solvent, vinyl acetate, ABN,N2 |
| 0.0 | 205.0 | 23 | TFE to maintain P = 205 psi heater set for 53° C. |
| 8.0 | 206.4 | 41 | |
| 12.0 | 228.1 | 58 | P set for TFE to maintain 225 psi |
| 14.0 | 232.7 | 60 | |
| 16.0 | 234.1 | 61 | |
| 18.0 | 234.4 | 60 | |
| 20.0 | 233.5 | 59 | |
| 24.0 | 231.3 | 58 | heater set for 60° C. |
| 45.0 | 232.5 | 60 | |
| 60.0 | 230.4 | 60 | reactor cooled and vented |

The reacted solution was evaporated with a rotary evaporator. The residue was dissolved in acetone (100 ml), precipitated in 1 liter of water and dried at 65° C. The yield was 22.8g having an intrinsic viscosity at 35° C. in DMF of 0.23 (0% insolubles). The low intrinsic viscosity is the result of excessive chain transfer from the ethylacetate reaction media. Elemental analysis indicated 38.90 wt % C, 3.09 wt % H, and 38.9 wt % F. The ratio of vinyl acetate to TFE was about 1:1. Proton nuclear magnetic resonance (Proton NMR) indicated that the vinyl acetate and TFE were 62% alternating. The procedure used is as follows:

Vinylacetate/tetrafluoroethylene copolymer (VAC/TFE) can be analyzed by $^1$H Fourier Transform Nuclear Magnetic Resonance Spectroscopy for the presence of alternating VAC/TFE units. The samples are dissolved in deuterated acetone and analyzed by a Varian XL-200 NMR spectrometer operating at 200 MH$_z$. Only the vinyl acetate units are being observed in this analysis, in particular the methine hydrogens on the same carbon as the ester group, but it follows that in a 1:1 copolymer the distribution of one monomer must be essentially the same as the distribution of other monomer. It is recognized that a slight excess of either monomer will result in an increased number of multiple units of that monomer distributed along the chain but for only slight excesses, the multiples are probably limited to dimers, trimers and tetramers. The methine hydrogens in the vinyl acetate group give resonances at 4.9, 5.3, 5.6 and 6.0 ppm. The 6.0 ppm resonance is assigned to the methine proton of vinyl acetate that is flanked by TFE units on either side. The 5.3 and 5.6 ppm resonances can be assigned to the methine hydrogens of dimers or the end VAC units of vinyl acetate multiples such as trimers and tetramers. The resonance at 4.9 ppm is assigned to methine hydrogens of vinyl acetate units flanked by other vinyl acetate groups such as the internal vinyl acetate units in trimers and tetramers. The ratio of the intergrated area of the 6.1 ppm peaks to the total intergrated area of peaks between 4.7 and 6.3 ppm gives the fraction of alternating vinyl acetate units in the copolymer.

EXAMPLE 10

Example 10 illustrates the preparation of a copolymer of vinyl acetate and TFE using 750 ml of acetic acid as a solvent in a 4 liter stirred reactor. The initiator used was 250 mg of ABN. Atmospheric oxygen is removed from the system by sparging with Nitrogen.

Twenty five grams of vinyl acetate were added to the acetic acid and ABN under about 75 psi of N$_2$ at the conditions summarized in Table below. This was followed by the addition of 150 psi of TFE. The reactants were stirred at 200 rpm.

TABLE 4

| Time (min.) | p (psi) | Temp (°C.) | Comment |
| --- | --- | --- | --- |
| 0.0 | 67 | 24 | acetic acid, vinyl acetate ABN, N$_2$ added |
| 0.0 | 199.4 | 24 | TFE added to a P = 199.4 |
| 9.0 | 200.0 | 23 | |
| 16.0 | 199.2 | 22 | |
| 21. | 199.2 | 22 | |
| 25.0 | 199.2 | 22 | |
| 30.0 | 199.2 | 22 | heater is set at 60° C. |
| 41.0 | 241.2 | 57 | |
| 43.5 | 247.2 | 59 | |
| 52 | 251.9 | 60 | |
| 62 | 250.6 | 60 | |

TABLE 4-continued

| Time (min.) | p (psi) | Temp (°C.) | Comment |
| --- | --- | --- | --- |
| 72 | 250.1 | 61 | |
| 77 | 249.2 | 61 | |
| 82 | 248.0 | 60 | |
| 91 | 248.2 | 61 | reactor cooled and vented |

The reactants were obtained by evaporation and precipitation similar to Example 9. The yield was 29.8 g having an intrinsic viscosity at 35° C. in DMF of 0.38 (0% insolubles). Elemental analysis indicated 40.69 wt % C; 2,88 wt % H; and 36.24 wt % F. The mole ratio of vinyl acetate to TFE was about 1.25 to 1. The low intrinsic viscosity is the result of excessive chain transfer from the acetic acid.

EXAMPLE 11

The copolymer of this Example was prepared by adding 800 ml of water, 200 ml of acetic acid; 75 psi N2; 15 grams of vinyl acetate. Atmospheric oxygen is removed by sparging with nitrogen. Then 150 psi TFE and ammonium persulfate (APS) were added. The reactants were stirred at 1500 rpm. The pressure of 150 psi was maintained and 15 g/hr of vinyl acetate added. The mixture was heated to 60° C. The conditions are summarized in Table 5 below.

TABLE 5

| RX Time (Min) | P (psi) | Temp (°C.) | Comment |
| --- | --- | --- | --- |
| 0.0 | 67.2 | 22 | H$_2$O, acetic acid, 15 g vinyl acetate, heat to 60° C. |
| 0.0 | 201.7 | 23 | TFE |
| 0.0 | 232.1 | 60 | APS added |
| 0.0 | 232.2 | 60 | |
| 5.0 | 232.8 | 61 | |
| 7.0 | 232.1 | 61 | |
| 8.0 | 231.4 | 61 | |
| 9.0 | 230.6 | 61 | |
| 39.0 | 229.3 | 60 | reactor cooled and vented |

The solid residue was filtered, washed with water and dried at 65° C. The yield was 37.9 grams. The intrinsic viscosity at 35° C. in DMF was 0.60 (5% insolubles). Elemental analysis indicated 36.72 wt % C; 2.61 wt % H; and 46.51 wt % F.

Figure 2:
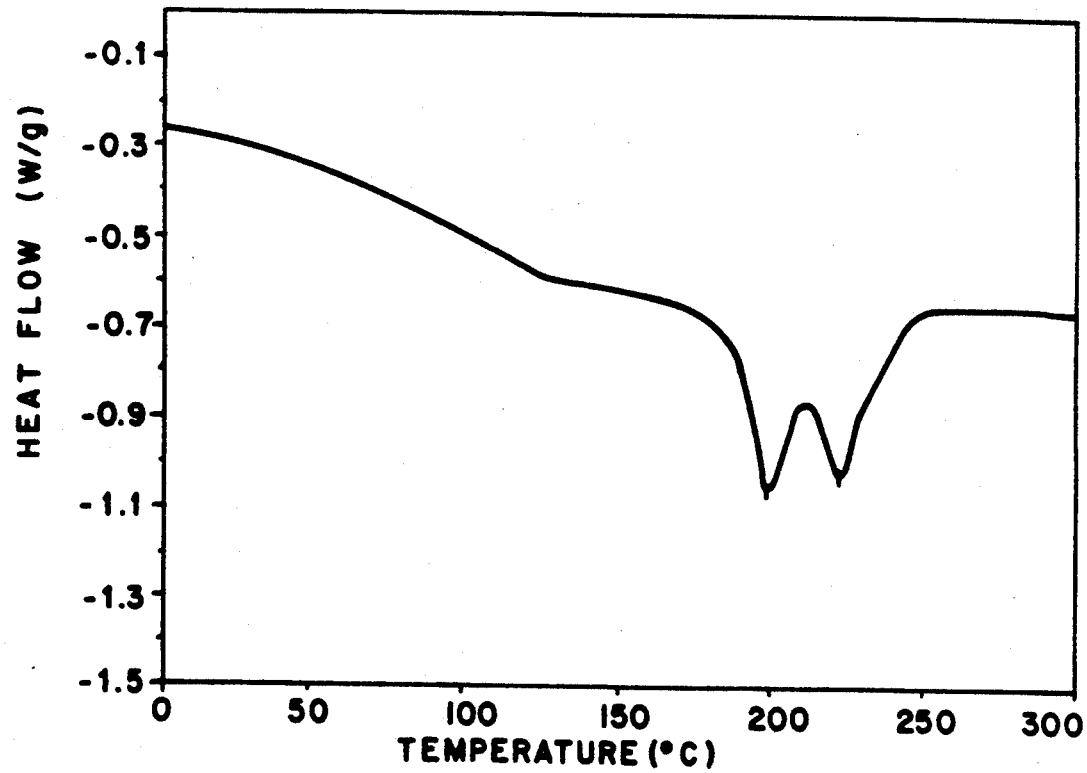

The copolymer was hydrolyzed in a 500 ml flask, by adding 30.8g, of copolymer (0.1426 moles) to 308 ml of methyl alcohol, 50% aqueous NaOH (5.7g, 14.41 ml, 0.1426 mole) and 6 ml of water under N$_2$ atmosphere. The mixture was refluxed for 1 hour at 67° C. and then filtered. Concentrated HCl (5ml) was added to obtain a pH of 6–7. The mixture was precipitated in water and dried at 85° C. to recover 14.9 g of a yellow polymer. TGA indicated the main degradation temperature was about 400° C. The DSC was measured and showed melting point peaks at 202° C. and 222° C. No peaks above 230° C. were observed which indicates the absence of large TFE blocks. After quick quenching in liquid nitrogen and reheating, the double peak was still present at 198° C. and 220° C. (FIG. 2) The DSC shows the presence of a mixture of two copolymers having alternating structures, which is believed to result from use of an insufficient amount of the cosolvent, acetic acid, in water. The intrinsic viscosity was 0.55 at 35° in dimethyl formamide (DMF).

EXAMPLE 12

To a four liter Zipperclav reactor are added 900 ml of purified water and 900 ml of glacial acetic acid. The solution is purged with a nitrogen stream for 0.5 hours to remove dissolved oxygen. Twelve mls of freshly distilled vinyl acetate, two grams of isopropanol and 0.41 grams of ascorbic acid are added and the solution is purged with $N_2$ for another half hour. The system is sealed and then pressurized with 40 psi of either nitrogen or argon and 135 psi of tetrafluoroethylene for a total pressure of 175 psi. The reaction mixture is maintained at 30° C. by immersion in a water bath. A solution of 0.2 g ammonium persulfate (APS) in 50 ml degassed water is pumped into the reactor to initiate polymerization which is indicated by a drop in reactor pressure due to polymerization of some of the tetrafluoroethylene. Tetrafluoroethylene is then fed into the reactor to maintain a constant reactor pressure of 175 psi and sufficient degassed vinyl acetate is pumped into the reactor concurrently to maintain a 1:1 molar ratio of co-monomers. The polymerization time is four hours with the reaction rate controlled by the continuous addition of APS solution (0.4 mg APS/ml) at the rate of 10ml/hour. During the polymerization, about 90 grams of tetrafluoroethylene and 89 ml of vinyl acetate were added to the reactor. The reaction mixture is cooled to about 5° C. and then vented. The polymer is recovered by filtration, and then washed twice with 1500 ml of purified water in one gallon S.S. Waring Blender The polymer is dried at 100° C. overnight in a circulating air oven. Recovered were 175g of copolymer having an intrinsic viscosity of 0.66 and VAC: TFE ratio of 1.05:1.

EXAMPLE 13

To a 500 ml flask are added 250 ml methanol, 25 gms of the copolymer from Example 12, and 3.5 ml of 50% aqueous sodium hydroxide. The reaction mixture was refluxed for 2.5 hours while stirring and then allowed to cool to room temperature. The polymer was recovered from solution by slowly adding it to 1500 ml of purified water in a one gallon S.S. Waring Blender. The precipitated polymer is washed in the blender twice with 1500 ml purified water and then dried overnight at 100° C. in a circulating air oven. Recovered were 18.9 g of copolymer with an intrinsic viscosity of 1.17. Infra-red analysis indicate essentially complete hydrolysis of all acetate groups. TGA indicates thermally stable to 325° C. with 23.2% residue at 900° C. DSC shows on initial Tm at 214° C., which after cooling from 300° C., on reheat appears at 213° C. No melting point peaks were observed above 230° C. These results indicate that the copolymer has a substantially uniform and homogenous structure which does not include large TFE blocks. The VAC:TFE ratio is about 1:1.

EXAMPLE 14

To a four liter Zipperclav reactor are added 990 ml of purified water and 810 ml of glacial acetic acid. The solution is purged with $N_2$ for 0.5 hours to remove dissolved oxygen. Twelve milliliters of freshly distilled vinyl acetate, two grams of isopropanol and 0.4 g of ascorbic acid are added and the solution is purged with $N_2$ for another half hour. The system is sealed and then pressurized with 40 psi of either $N_2$ or argon and 135 psi of tetrafluoroethylene (TFE) for a total pressure of 175 psi. The reaction mixture is maintained at 30° C. by immersion in a water bath. A solution of 0.2 g ammonium presulfate (APS) in 50 ml degassed water is pumped into the reactor to initiate polymerization which is indicated by a drop in reactor pressure due to polymerization of some of the TFE. TFE is then fed into the reactor to maintain a constant reactor pressure of 175 psi and sufficient degassed vinyl acetate is pumped into the reactor concurrently to maintain about a 1:1 molar ratio of co-monomers. The polymerization time is 4 hours with the reaction rate being controlled by the continuous additions of APS solution (0.4 mg APS per ml) at the rate of 10 ml/hour. During the polymerization, about 95 g. of TFE and 97 ml vinyl acetate were added to the reactor. The reaction mixture is cooled to 5° C. and then vented. The polymer is recovered by filtration, and then washed twice with 1500 ml of purified water in a one gallon S.S. Waring Blender. The polymer is dried at 100° C. overnight in a circulating air oven. Recovered were 180 gms of copolymer with an intrinsic viscosity of 0.7 and a VAc: TFE ratio of 1.1:1.

EXAMPLE 15

To a 500 ml flask is added 250 ml methanol, 25 grams of the copolymer from Example 14, and 3.5 ml of 50% aqueous sodium hydroxide. The reaction mixture is refluxed for two hours while stirring and then allowed to cool to room temperature. The polymer is recovered from solution by slowly adding it to 1500 ml of purified water in a one gallon S.S. Waring Blender. The precipitated polymer is washed in the blender twice with 1500 ml portions of purified water, and then dried overnight at 100° C. in a circulating air oven. Recovered were 18.4 g of copolymer with an intrinsic viscosity of 1.23. Infra Red analysis indicates essentially complete hydrolysis of all acetate groups. TGA indicates a thermal stability of 325° C., with 23.1 g of residue at 900° C. DSC shows an initial Tm at 213° C., which after cooling from 300° C., reheat appears at 211° which indicates that the copolymer has a substantially uniform and homogenous structure. The VAC:TFE ratio is about 1.1:1.

EXAMPLES 16 TO 21 AND COMP. EX.1

The following examples illustrate the preparation of a copolymer of tetrafluoroethylene (TFE) and vinyl acetate (VAc) in accordance with the method of the present invention. Each of the following copolymers was made in a 0.5 or 4 liter reactor as indicated by volume requirement. The vinyl acetate monomer was provided as a liquid and the TFE fed as a gas. The atmosphere was a mixture of TFE and nitrogen. Initially, the reactor was charged with water, vinyl acetate, acetic acid (AcOH) and ascorbic acid as indicated. Nitrogen ($N_2$) was added. Atmospheric oxygen is removed by sparging with nitrogen. The stirrer was operated at 1500 rpm. TFE was added to the indicated pressure and the reactor closed and heated. An ammonium persulfate (APS) solution in water was injected to initiate polymerization. In Example 16, after the initial charge, VAc was added at 25 g/hour. In Comparative 1, after the initial charge, no additional VAc was added. In Example 18 after the initial charge, additional VAc was added at the following rates: 0–4 minutes, 0 VAc; 4–12, minutes, 40 g/hour; 12–16 minutes, 149 g/hour; 16–24 minute, 213 g/hour; 24–28 minutes, 128 g/hour; and 28–34 minutes 170 g/hour. In Example 19, after the initial charge, additional VAc was added at the following rates: 0–15.5 minutes, 0 VAc; 15.5–25.5 minutes, 20 g/hour; 25.5–35.5 minutes, 15 g/hour; 35.5–45.5 minutes, 10 g/hour: 45.5-95.5 minutes, 17 g/hour; 95.5-135.5 minutes, 21 g/hour. The polymerization was allowed to be conducted at the indicated temperatures for the indicated time. A white granular solid was formed and collected on a coarse frit. The polymer was washed with water and dried at the indicated conditions. The copolymers were analyzed by elemental analysis for the percents by weight of C and H. The intrinsic viscosity [η] was measured at 35° C. in dimethyl formamide (DMF).

The reaction parameters and test results are summarized below in Table 6.

TABLE 6

| | Ex. 16 | Ex. 17 | Comp Ex. 1 | Ex. 18 |
|---|---|---|---|---|
| VAc, g (initial) | 23 | 15 | 15 | 5 |
| VAc, g/hr added | 25 | 15 | — | * |
| TFE, psi | 150 | 150 | 150 | 150 |
| N$_2$, psi | 75 | 75 | 75 | 75 |
| H$_2$O ml | 800 | 800 | 150 | 800 |
| AcOH, ml | 200 | 200 | — | 200 |
| APS, mg/ml H$_2$O | 300/10 | 300/10 | 0.1 | 300/10 |
| STIR RATE, rpm | 1500 | 1500 | 1500 | 1500 |
| Rx time min | 40 | 39 | 60 | 34 |
| Rx T, °C. | 58-62 | 6-61 | 65-76 | 25-30 |
| Dry T (°C.)/P (mm) | 65/1 | 65/1 | 50/1 | — |
| Yield, g | 52.2 | 37.9 | 25.1 | 149.1 |
| C, wt. % | 40.53 | 36.72 | 36.18 | 38.37 |
| H, wt. % | 3.43 | 2.61 | 2.60 | 2.86 |
| [η] | 0.85 | 0.6 | — | 0.32 |
| Hydrolysis | Ex 22 | Ex 26 | Comp Ex 2 could[2] not be hydrolyze | Ex 23 |
| DSC | double[1] peak | double[1] peak | | single[3] peak |

| | Ex. 19 | Ex. 20 | Ex. 21 |
|---|---|---|---|
| VAc, g (initial) | 5 | 2.5 g | 4.6 |
| VAc, g/hr added | * | 60 | 50 |
| TFE, psi | 150 | 150 | 150 |
| N$_2$, psi | 75 | 75 | 75 |
| H$_2$O ml | 800 | 800 | 1600 |
| AcOH, ml | 200 | 200 | 400 |
| APS, mg/ml H$_2$O | 150/10 | 300 mg/10 | 600 mg/10 |
| STIR RATE, rpm | 1500 | 1500 | 1500 |
| Rx time min | 135.5 | 130 | 130 |
| Rx T, °C. | 59-60 | 60-62 | 59-61 |
| Dry T (°C.)/P (mm) | — | 85/— | 65/— |
| Yield, g | 82.2 | 19.1 | 32.5 |
| C, wt. % | 37.83 | 40.21 | 36.82 |
| H, wt. % | 2.90 | 3.47 | 2.62 |
| [η] | 0.77 | 0.92 | — |
| Hydrolysis | Ex 24, 25 | Ex 26 | Ex 27 |
| DSC | single[3] peak | single[3] peak | single[3] peak |

*See above
[1]Double peaks with no peak above about 230° C. which indicated an absence of large TFE blocks and the presence of two alternating copolymers.
[2]Could not be hydrolyzed indicating large TFE blocks.
[3]Single peak with no peaks above about 230° C. which indicated alternating copolymer having about one ratio of fluorinated units to vinyl units, and an absence of large TFE blocks.

EXAMPLE 22

Example 22 illustrates the hydrolysis of a tetrafluoroethylene, vinyl acetate copolymer made from Example 16. The copolymer (46.5 grams) was dissolved in 465 ml of methanol with 21 ml of a 50 percent aqueous sodium hydroxide solution under a nitrogen atmosphere. The reactants were heated for 1 hour under reflux. The solution was cooled and filtered through a 5 micrometer filter. 47 ml of concentrated HCl was added to achieve a pH of 1. The solution was precipitated and washed with water. The resulting polymer was dried overnight at 85° C. in a circulating air oven. 31.24 g of a light yellow polymer was recovered. The thermal gravimetric analysis (TGA) gave a 5 percent weight loss by 370° C. with a major weight loss at greater than 400° C. which indicated the relatively high thermal stability of the copolymer. Differential scanning calorimetry (DSC) testing indicated double melting point peaks but no melting point peaks above 230° C., which indicated an absence of large TFE blocks. The intrinsic viscosity was 0.63 measured in DMF at 35° C.

The double peak observed upon DSC testing is believed to indicate an excess of vinyl acetate initially and during the copolymerization. Even though the VAc: TFE mole ratio was 1.2:1 in the copolymer, it is believed that there is an imbalance of monomers due to lack of co-solvent causing a mixture of two types of copolymers each having a substantially uniform and homogeneous distribution of fluorinated and vinyl units in the copolymer backbone, one slightly richer in TFE and one slightly richer in VAC.

EXAMPLE 23

Following is the procedure for the hydrolysis of a vinyl acetate/tetrafluoroethylene (VAc/TFE) copolymer of Example 18 to vinyl alcohol/tetrafluoroethylene (VOH/TFE) copolymer, and an evaluation of the film forming characteristics of the hydrolyzed product and the oxygen permeability and crystallinity of the film formed from the hydrolyzed product as a function of humidity. 25 grams of the VAc/TFE made in Example 18 were fed to a 3 neck 100 ml round bottom flask containing a stir bar and a thermometer as well as a water condenser and a nitrogen inlet. The flask contained 250 ml of methanol, 10.5 ml of 50 percent aqueous sodium hydroxide plus 18.5 ml of water. The mixture was heated and refluxed at 67° C. for 2 hours. A hazy solution formed indicating a small amount of undissolved material. The mixture was filtered and acidified with concentrated HCl to a pH of 5. The polymer solution was precipitated in two portions into 600 ml of water in a Waring Blender. The solids were collected and were washed three times in 600 ml of water and then dried in a circulating air oven at 85° C. overnight. 13.0 grams of cream colored solids were obtained (66.7% yield). The TGA showed the samples to be stable up to 350° C. The samples began degrading above 350° C. There was an 18.5% residue at 850° C. DSC was measured upon heating to 300° C., quenching and reheating. The following melting point was observed Tm=206° C. Upon reheating, the Tm was measured at 203° C. There was only one melting point which indicated that the copolymer had a substantially uniform and homogeneous distribution of the fluorinated and vinyl units in the copolymer backbone and an absence of large TFE blocks. The copolymer was formed into a film by compression at 230° C. using an Apollo platen press. The film made was about 3 inches in diameter and 3 mils thick. The film was examined by TEM (Transmission Electron Microscope) and observed to be uniformly spherulitic. The spherulites were about 0.3 um in diameter with a lamellae 20 μm in width. This indicated that the copolymer had good film forming properties. This material was found to have 34.87 wt.% C, and 2.03 wt.% H. The mole ratio of VOH:TFE was 1.20:1. The sample was pressed into a film having good tensile properties. The film was tested for oxygen permeability using an O-Tran 1000 oxygen permeability tester made by Mocon Corp. At 0 percent relative humidity, a 3 mil thick film had 0.013 cc/mil/100 in/day. The sample was tested at 100 percent relative humidity and had 0.08/cc/mil/100 sq in/per day. This indicated that the film had low oxygen permeability regardless of humidity.

EXAMPLE 24

Example 24 is an example of hydrolyzing 25 g of the vinyl acetate/TFE copolymer made in Example 19. The vinyl acetate/TFE copolymer was hydrolyzed in a 500 ml flask with 10 ml of a 50 percent aqueous sodium hydroxide (NaOH) solution in 250 ml methanol (MeOH) and 5 ml water, under $N_2$ in presence of heat. The procedure was similar to that of Example 22 except it was refluxed for 1 hour. The result was a fairly clear amber very viscous solution. About 16 g of Celite filter aid was added and it was filtered. The filtrate was acidified with a total of 10 ml of concentrated hydrochloric acid. The polymer was precipitated in water in a Waring Blender. After filtering, the solids were collected and dried at about 85° C. overnight. About 17.2 g of an off white polymer was recovered. DSC was measured and indicated a single melting point at about 213° C. Upon reheating, after quenching from 300° C., the melt point appears at 211° C. This indicates that the copolymer has a substantially uniform and homogeneous distribution of fluorinated and vinyl units in the copolymer backbone. No melting point peaks were observed at temperatures greater than 230° C. which indicated an absence of large TFE blocks.

EXAMPLE 25

Example 24 was repeated to make additional VOH/TFE copolymer to evaluate the film forming characteristics of the copolymer. The copolymer has an intrinsic viscosity in DMF at 35° C. of 0.62 and a mole ratio of VOH/TFE of 1:1.2. The copolymer was molded into film and quick quenched. The film was heated at various temperatures in an environmental chamber for 15 minutes and drawn. The draw ratio, and elongation to break of the films annealed at different temperatures are summarized in Table 7. Crystallinity of the film was measure by X-ray. The initial unoriented polymer was 30% crystalline.

TABLE 7

| Temp | Draw | % Crystallinity |
|---|---|---|
| 90° C. | 3:1 | — |
| 100° C. | 4.2:1 | 33% |
| 110° C. | 3:1 | — |
| 120° C. | 1.87:1 | — |
| 140° C. | Break | 45% |

The maximum elongation was at 100° C. with little increase in crystallinity. As the temperature increased, crystallinity increased with the film breaking at 140° C. The polymer was tough and reasonably clear. This indicated small crystallites and good film forming properties and probable use for packaging applications.

EXAMPLES 26, 27 AND 28

The copolymers of Examples 17, 20 and 21 were hydrolyzed as Examples 26, 27 and 28, respectively, according to the procedure of Example 24. The details and results are summarized in table 8 below:

TABLE 8

|  | Ex 26 | Ex 27 | Ex 28 |
|---|---|---|---|
| Copolymer Ex | Ex 17 | Ex 20 | Ex 21 |
| VAc/TFE (g) | 30.8 | 25 | 25.4 |
| MeOH (ml) | 308 | 250 | 254 |
| NaOH (ml) | 11.41 | 11.8 | 9.4 |
| $H_2O$ (ml) | 6 | 6 | 4 |
| Reflux @ 67° C. (hr) | 1 | 1 | 1 |
| HCl (ml) | 5 | 12 | 10 |
| VOH/TFE (g) | 14.9 | 17.6 | 17.3 |
| TGA (degrad T, °C.) | 400° C. | 400° C. | 350° C. |
| DSC initial heating | 202/222° C. | 204° C. | 226° C. |
| cool from 300° C. | 198/222° C. | 204° C. | 225° C. |
| [η] | 0.55 | 0.65 | 0.49 |

The results of the DSC experiments show that the polymer of Example 26 is a mixture of two copolymers having a uniform and homogeneous alternating distribution of fluorinated and vinyl units in the copolymer backbone, and that the copolymers of Example 27 and 28 are single copolymers each having a uniform and homogeneous and alternating distribution of fluorinated and vinyl units in the copolymer backbone. The absence of melting point peaks of greater than 230° C. in Examples 26, 27 and 28 indicate the absence of large TFE blocks.

COMPARATIVE EXAMPLE 2

Hydrolysis of the copolymer made in Comparative Example 1 was attempted generally following the procedure of Example 23, using 10 grams of the copolymer of Comp. Ex. 1, 150 ml of methanol, 3.4 ml of 50 percent aqueous sodium hydroxide.

The polymer was observed to swell and float to the top of the methanol. The product was insoluble. After one and a half hours of reflux at 67° C., 0.9 ml of NaOH was added, after 3 hours, 25 ml of NaOH with no change. The mass was left for a weekend at room temperature but still did not dissolve. The result was a reddish gelatinous mass which indicated that the polymer did not go into solution and hydrolyze.

It is believed that the absence of co-solvent does not allow the uniform diffusion of comonomers into the growing copolymerizing particles. This results in the formation of a block copolymer having high content TFE segments and high content VAc segments. The presence of the TFE segments prevents solubilization of the copolymer during hydrolysis resulting in the gelatinous mass which could not be hydrolyzed.

The presence of co-solvents will cause swelling of the growing polymer particles and the uniform diffusion of comonomers into the particle. This results in the desired alternating copolymerization forming a copolymer having a substantially uniform and homogeneous distribution of fluorinated and vinyl units in the copolymer backbone.

COMPARATIVE EXAMPLE 3

An attempt was made to duplicate Example 5 of British Patent 583,482 which resulted in the formation of a block copolymer. To a four liter stainless Zipperclav reactor system was added 600 ml of water treated by a Millipore system and degassed for one hour by sparging with nitrogen. Add 0.8 gram ammonium persulfate in 20 ml water (degassed), 130 ml freshly distilled vinylacetate (degassed) and the system is pressurized with 45 psi $N_2$ and 90 psi TFE. While stirring at 500 RPM, the reactor is heated to 75° C. and this temperature is maintained for 6 hours. The pressure dropped from 160 psi to 110 psi. The reaction mixture was then cooled and 137 grams of copolymer was recovered. Elemental analysis was C (44.42%), H (4.36% and F (28.34%) which indicates a comonomer ratio of 2:1 VAC:TFE. It was not possible to obtain a meaningful intrinsic viscosity since 58% of it was insoluble in DMF. No NMR studies could be made again because no solvents could be found. Analysis by DSC reveals a melting point at about 325° C., which indicates the presence of polytetrafluoroethylene block which confirmed that the copolymer was a block copolymer of VAC and TFE.

Twenty five grams of the copolymer, 250 ml methanol, 5 ml water and 9.4 ml of 51.2% aqueous caustic was refluxed for 2.5 hours. The copolymer did not dissolve but formed a spongy mass. The total reaction mixture was cooled to room temperature and then poured into water in a Waring blender. The polymer was washed with additional water and then dried in a circulating air oven at 100° C. overnight. Recovered 16.2 g ( 75%). The low yield would indicate that the vinylalcohol rich polymers (large blocks of homopolymers) are soluble in the precipitating media. It was not possible to obtain an intrinsic viscosity since 75% of the polymer was insoluble. Infra red analysis indicated that 40% of the acetate groups of the VAc blocks were not hydrolyzed. Elemental analysis of C (38.24%), H (4.2%) and F(33.36%) suggests partial hydrolysis. TGA indicates a continuing weight loss with 5.6% being lost at 300° C. DSC shows an initial $T_m$ at 210° C. and after cooling from 300° C., a reheat of $T_m$ of 196° C. The lowering of the melting point indicated that the block copolymer had poor melt stability. Heating a sample in the DSC to 350° C. again reveals a melting point at about 325° C. indicating PTFE blocks. The copolymer could not be molded at 250° C. due to incomplete melting and decomposition.

In an attempt to obtain a copolymer ratio closer to 1:1, the polymerization was repeated using 60 psi $N_2$ and 120 psi TFE. 253 g polymer was recovered which was 80% insoluble in DMF. Several elemental analyses indicated a comonomer ratio VAc:TFE from 1:1.2 to 1:1.7 , a non-homogeneous product. DSC indicates a much larger melting peak at 325° C.; a greater amount of PTFE blocks being produced. Attempted hydrolysis again was complicated by insolubility and only 50% of the acetate groups were hydrolyzed. TGA indicates decomposition starting at about 250° C. which indicated that the partially hydrolyzed copolymer has a low thermal stability. The DSC had an initial $T_m$ 211° C. and after cooling from 300° C. a reheat $T_m$ at 204° C. Heating to 350° C. revealed a large $T_m$ at 325° C. indicating the presence of large PTFE blocks. This copolymer had bad film forming properties and could not be molded into film for evaluation of the oxygen permeability.

EXAMPLE 29

To a four liter zipperclav reactor are added 900 ml acetic acid, 900 ml deionized water, 0.31 g ascorbic acid, 16 ml vinyl acetate, and 5 ml isopropanol. The solution is sparged with nitrogen to remove oxygen and the reactor sealed. The reactor is pressurized with 75 psi nitrogen and 152 psi tetrafluoroethylene. The reaction mixture is stirred at 750 rpm and the temperature is 21° C. A solution of 0.2 g ammonium persulfate in 25 ml of degassed H2O is pumped into the reactor to initiate the polymerization. Within two minutes, polymerization begins as indicated by a drop in reactor pressure of about two pounds and an increase in reactor temperature to about 24° C. Immediately, tetrafluoroethylene is fed to the reactor to maintain a total reactor pressure of about 225 psi and vinylacetate (54 ml) is pumped into the reactor concurrently to maintain stoichiometry. The total reaction time is about thirty minutes and the final temperature is 29° C. During the first 20 minutes, an additional 7 ml of the ammonium persulfate solution is added. At the end of the reaction, there is no tetrafluoroethylene being absorbed. The vinylacetate feed is stopped and the reactor vented. The copolymer is recovered, washed in a Waring blender with deionized water and then dried overnight at 100° C. in a circulating air oven. One hundred thirty three and five tenths grams of copolymer is recovered with an intrinsic viscosity of 0.74 (DMF, 35° C.).

The copolymer is hydrolyzed by adding 50 g to 500 ml methanol, 10 ml deionized water and 13.7 ml of 51.2% aqueous NaOH and refluxing for 2.25 hours. After cooling to room temperature, tramp dirt is removed by filtration through #41 Whatman filter paper and the polymer is recovered by adding the filtrate to 1500 ml of deionized water in a Waring blender. The precipitated copolymer is washed in the blender three times with 1500 ml portions of deionized water and then dried overnight at 100° C. in a circulating air oven. Thirty six and six tenths grams (94.5%) of the copolymer is recovered which has an intrinsic viscosity of 0.89 (DMF, 35° C.). Elemental analysis of carbon (33.15%), hydrogen (2.67%), and fluorine (53.07%) indicates a comonomer ratio of about 1:1. The initial melting point by DSC is 213° C. and after cooling from 300° C., the reheat melting point is again 213° C. which indicates that the copolymer has a substantially uniform and homogeneous distribution of fluorinated and vinyl units in the copolymer backbone.

EXAMPLE 30

To a four liter Zipperclav reactor are added 1260 ml of acetic acid, 540 ml of deionized water, 0.31 g of ascorbic acid, and 20 ml. of vinyl acetate. The solution sparged with nitrogen to remove oxygen and the reactor is sealed and pressurized with 75 psi nitrogen and 150 psi tetrafluoroethylene. The reactor temperature is 24° C. and is stirred at 750 rpm. A solution of 0.26 g ammonium persulfate and 30 ml deionized water is degassed and 3 ml is pumped into the reactor to initiate polymerization. Within four minutes, copolymerization begins as evidenced by a pressure drop and a temperature rise to 25° C. Immediately, tetrafluoroethylene is fed to the reactor to maintain a constant pressure of about 225 psi and during the thirty minute reaction period, 46 ml of degassed vinylacetate is concurrently pumped into the reactor to maintain stoichometry. During the first twenty minutes of the copolymerization, an additional 9 ml of ammonium persulfate solution is pumped into the reactor. The temperature rose to 28° C. during the polymerization. The reaction was continued for another 10 minutes during which time no more initiator was added. No more tetrafluoroethylene is being absorbed so the vinylacetate feed is stopped and the reactor is vented. The copolymer is recovered and washed in a Waring blender with deionized water. After drying overnight at 100° C. in a circulating air oven, 105.6 g of copolymer is obtained with an intrinsic viscosity of 1.26 (DMF, 35° C.). The elemental analysis indicates a comonomer ratio of 1.05:1 VAC:TFE.

The copolymer is hydrolyzed by adding 50 g to 500 ml methanol, 10 ml water and 13.4 ml of 51.2% aqueous NaOH and refluxing for three hours. After cooling to room temperature, 16 g of Celite filter aid is added and the solution is filtered through #41 Whatman filter paper. The copolymer is precipitated into 1500 ml deionized water in a Waring blends and then washed an additional three times in the blender with 1500 ml portions of deionized water. After drying overnight at 100° C. in a circulating air oven, 34.5 g (84%) of polymer is recovered having an intrinsic viscosity of 1.69 (DMF, 35° C.). Elemental analysis of carbon (34.03%), hydrogen (3.06%), and fluorine (51.60%) indicates a comonomer ratio of 1.12:1 VAC:TFE. The initial melting point by DSC is 213° C. and after cooling from 300° C., the reheat melting point is 211° C. There were no melting point peaks above 230° C. These results indicated that the copolymer has a substantially uniform and homogeneous distribution of fluorinated and vinyl units in the copolymer backbone and does not include blocks of TFE and vinyl acetate. It is believed that the lower yield of polymer is due to retention of polymer on the Celite filter cake.

EXAMPLES 31 AND 32

The following examples illustrate the preparation of a copolymer of tetrafluoroethylene (TFE) and vinyl acetate (VAc). The polymerization was conducted using the fluorocarbon G-113 (1,1,2-trichloro-1,2,2 trifluoroethane) as a solvent. The initiator used was bis(perfluorobutyryl) peroxide (4-P). The reaction was conducted in a 500 ml or 4 litter closed reactor. The reactants were stirred at a stir rate of 200 rpm. The atmosphere above the solvent was a mixture of nitrogen and TFE held at a constant pressure. The copolymer was collected as a gelatinous mass and dried to a white solid. The processing conditions are summarized in Table 9. The composition in each case was determined by elemental analysis. The percents by weight of C and H are summarized below. The intrinsic viscosity [$\eta$] was measured at 35° C. in dimethyl formamide (DMF).

TABLE 9

|  | Ex. 31 | Ex. 32 |
| --- | --- | --- |
| Solvent G-113, ml | 2100 | 400 |
| 4-P, mg | 350 | 100 |
| VAC, (g) initial | 35 | 3 |
| Vac, (g/hr) feed | 7 | 1.5 |
| N$_2$, psi | 42.5 | 50 |
| TFE, psi | 85 | 100 |
| stir, rpm | 200 | 200 |
| time, min | 321 | 240 |
| drying,T,P (°C., mm) | 65° C., 1 mm | 80° C., 1 mm |
| Yield, g | 84.7 | 16.0 |
| [$\eta$] | 1.35 | 1.29 |
| % C | 38.74 | 35.98 |
| % H | 3.21 | 2.77 |

EXAMPLE 33

Example 33 illustrates the hydrolysis of the tetrafluoroethylene/vinyl acetate copolymer made in Example 31, the evaluation of the film forming characteristics of the hydrolyzed product and the determination of the oxygen permeability of the film formed from the hydrolyzed product as a function of humidity. The copolymer was hydrolyzed by adding 53.2 g to 532 ml of methanol, 10.7 ml of deionized water and 21.7 ml of 50% aqueous sodium hydroxide and refluxing for 3 hrs. A light amber solution formed with a small amount of undissolved materials. After cooling to room temperature, 19.8 g of Celite filter aid was added. The solution was filtered through #40 Whatman filter paper and refiltered through a millipore filter (5µm) to provide a clear dark yellow solution having a pH of 10. The solids were precipitated by the addition of the solution into a one gallon Waring blender containing 2.5 liters of water which had been passed through a millipore filter The solids were isolated in two batches and the combined solids washed three times with two and one-half liter portions of water. The solids were collected and dried under vacuum over night at room temperature. A cream colored solid (38.1 g) was recovered which had an intrinsic viscosity of 1.52 (DMF,35° C.). Thermal gravimetric analysis (TFA) indicated a 1% wgt. loss between room temperature and 100° C. followed by a stable plateau up to about 325° C. with a major decomposition above 325° C. The initial melting point by DSC was 211° C., and after cooling from 300° C., the reheat melting point was 208° C. There were no melting point peaks above 230° C. These results indicated that the copolymer had a substantially uniform and homogeneous distribution of fluorinated and vinyl units in the copolymer backbone and did not include large poly TFE blocks.

The hydrolyzed copolymer was formed into a film and tested for oxygen permeability using an Ox-tron 100 oxygen permeability tester made by Mocon Corp. This indicated that the hydrolyzed copolymer had good film forming properties. The oxygen permeability at 0% relative humidity (R.H.) was 0.056 cc/mil/100in.2/ day and at 100% RH was 0.032cc/mil/100in.$^2$/day. This indicated that the film had low permeability to oxygen regardless of the relative humidity.

EXAMPLE 34

Example 34 illustrates the hydrolysis of the tetrafluoroethylene/vinyl acetate copolymer made in Example 32, the evaluation of the film forming characteristics of the hydrolyzed product and the determination of the oxygen permeability of the film formed from the hydrolyzed product as a function of humidity. The copolymer was hydrolyzed by adding 10.0 g to 200 ml of methanol, 5 ml of deionized water and 3.70 ml of 50% aqueous sodium hydroxide and refluxing for 3 hrs. After cooling to room temperature, tramp dirt was removed by filtration through a 5 µm millipore filter to provide a clear yellow solution. The solution was then acidified to a pH of 1 by the addition of 10 ml of concentrated HCL with stirring for ¼ hr. The product was precipitated in two batches as a white fluffy solid by addition of the solution to 500 ml of millipore filtered water in a Waring blender. The precipitated product was collected by filtration and the combined solids washed three times with 500 ml portions of water. These washed solids were collected and dried over night in a vacuum oven at 64° C. A fluffy white solid (6.9 g) was recovered.

The hydrolyzed copolymer was formed into a film and tested for oxygen permeability using an Ox-tron 1000 oxygen permeability tester made by Mocon Corp. This indicated that the hydrolyzed copolymer had good film forming properties. The oxygen permeability at 0% relative humidity (R.H.) was 0.15cc/mil/100in.$^2$/day and at 100% RH was 0.03cc/mil/100in.$^2$/day. This indicated that the film had low permeability to oxygen regardless of relative humidity.

EXAMPLE 35

Example 29 was scaled up to a 500 gallon reactor with the following modifications. The reactor was pressurized to 45 psi with $N_2$ and then tetrafluoroethylene was added to maintain a total reaction pressure of 170 psi. The monomers were added in a ratio to maintain a stoichiometry of 1 VAC:1.1 TFE, with the polymerization period being four hours. About 200 pounds of copolymer were recovered and NMR indicated 82.3% alternation of TFE and of VAc monomer units, 16.3% dimers and 1.4% as trimers and possibly tetramers. After being hydrolyzed in the usual manner, DSC indicated a very sharp initial melting point of 216° C., which after cooling from 300° C. again had a sharp melting point at 216° C. There were no higher melting points observed. This analysis again indicated a very uniform copolymer with no indications of large blocks of either monomer.

While exemplary embodiments of the invention have been described, the true scope of the invention is to be determined from the following claims:

We claim:

1. A process for forming a copolymer of 40 to 60 mole percent of fluorinated units having the formula $(R_1R_2C=CR_3F)$ wherein $R_1$, $R_2$ and $R_3$ are the same or different and are selected from H and F, and $R_3$ is Cl, when $R_1$ and $R_2$ are F; and correspondingly from 60 to 40 mole percent of vinyl units having the formula $(H_2C-CHR_x)$, wherein $R_x$ is a radical of the formula $-O_2-CR_y$ wherein $R_y$ is a radical selected from $-CH_3$, and $-C_2H_5$, wherein the fluorinated units and vinyl units are in a substantially alternating distribution as determined by 1H Fourier Transform Nuclear Magnetic Resonance Spectroscopy, said process comprises copolymerizing a fluoro monomer of the formula $R_1R_2C=CR_3F$ and a vinyl monomer of the formula $H_2C=CHR_x$ in a reaction medium of a saturated fluorocarbon, a saturated chlorocarbon, a saturated chlorofluoro carbon or a combination thereof in the presence of an initiator, and maintaining the molar ratio of vinyl monomer to fluoromonomer dissolved in the reaction medium constant or substantially constant during said co-polymerizing to form a copolymer having an alternating or substantially alternating distribution of monomeric units derived from said vinyl monomer and said fluoromonomer in said copolymeric backbone.

2. The process of claim 1 wherein the degree of alternation of the fluorinated units and vinyl units is at least about 60%.

3. The process of claim 1 wherein the degree of alternation of fluorinated units and vinyl units is from about 40% to about 80%.

4. The process of claim 2 wherein said degree of alternation is from about 60% to about 80%.

5. The process of claim 2 having an intrinsic viscosity at 35° C. in dimethyl formamide according to the procedure of ASTM D-1238 equal to or greater than about 0.5.

6. The process of claim 5 wherein said intrinsic viscosity is from about 0.5 to about 2.5.

7. The process of claim 1 having an intrinsic viscosity at 35° C. in dimethylformamaide according to the procedure of ASTM D-1238 of from about 0.2 to about 2.5.

8. The process of claim 7 wherein said intrinsic viscosity is from about 0.3 to about 1.3.

9. A process of claim 8 wherein said intrinsic viscosity is from about 0.5 to about 1.2.

10. The process of claim 6 of from about 45 to about 55 mole percent of fluorinated units and correspondingly from about 55 to about 45 mole percent of vinyl units.

11. The process of claim 10 wherein the reaction medium comprises a perfluorocarbon or a chlorofluorocarbon which does not have a carbon hydrogen bond in the molecule, or a combination thereof.

12. The process of claim 11 wherein said perfluorocarbon and said chlorofluorocarbon include from 1 to about 4 carbon atoms.

13. The process of claim 12 wherein the said perfluorocarbon and said chlorofluorocarbon have 1 to about 2 carbon atoms.

14. The process of claim 13 wherein said perfluorocarbon and said chlorofluorocarbon are selected from the group consisting of dichlorodifluoromethane, trichloromonofluoromethane, chlorotrifluoromethane, tetrachlorodifluoroethane, trichlorotrifluoroethane, dichlorotetrafluoroethane and hexafluorethane.

15. The process of claim 14 wherein said medium is tetrachlorodifluoroethane.

16. The process of claim 1 wherein said fluoromonomer is tetrafluoroethylene.

17. The process of claim 1 wherein the vinyl monomer is vinyl acetate.

18. The process of claim 1 wherein the fluoromonomer is tetrafluoroethylene and the vinyl monomer is vinyl acetate.

19. The process of claim 18 wherein said reaction medium is tetrachlorodifluoroethane.

20. The process of claim 11 wherein the amount of vinyl monomer is an amount capable of dissolving in said reaction medium without forming a distinct vinyl monomer phase.

21. The process of claim 20 wherein maintaining said molar ratio comprises adding additional vinyl monomer to said reaction medium as vinyl monomer in said medium is consumed at a rate based on the rate of fluoromonomer consumption.

22. The process of claim 1 wherein said co-polymerizing is carried out in an inert atmosphere.

23. The method as recited in claim 11 wherein copolymerization said monomers and maintaining said molar ration comprises:
charging a reaction vessel with said reaction medium, polymerization initiator and a selected amount of said vinyl monomer which does not exceed the solubility thereof in said reaction, medium in an inert atmosphere;
charging said vessel with a gaseous fluoromonomer until said pressure reaches a selected value which corresponds to a selected concentration of fluoromonomer in said reactor; and
copolymerizing and fluoromonomer and said vinyl monomer while adding fluoromonomer at a rate sufficient to maintain said pressure at said selected value and adding additional vinyl monomer at a rate sufficient to maintain the concentration of vinyl monomer dissolved in the reaction medium at the selected amount.

24. The process of claim 23 wherein the rate of addition of said additional vinyl monomer is based on the rate of consumption of fluoromonomer in said reactor.

25. The method as recited in claim 1 wherein the initiator is an oxidation-reduction system comprising an oxidizing agent and a reducing agent.

26. The method ad recited in claim 25 wherein the oxidizing agent is a water soluble alkali metal or alkaline earth metal salt of persulfuric acid or an ammonium salt of persulfuric acid.

27. The method as recited in claim 26 wherein the oxidizing agent is ammonium persulfate.

28. The method as recited in claim 25 wherein the reducing agent is selected from the group consisting of ammonium or alkali metal sulfites, thiosulfites, bisulfites, hydrosulfites, and ascorbic acid.

* * * * *